United States Patent [19]
Casey, Sr.

[11] Patent Number: 5,692,386
[45] Date of Patent: Dec. 2, 1997

[54] COOLING APPARATUS FOR AN ANIMAL CONFINEMENT HOUSE

[75] Inventor: William Stephen Casey, Sr., Gardendale, Ala.

[73] Assignee: C & S Manufacturing, Munford, Ala.

[21] Appl. No.: 689,415

[22] Filed: Aug. 9, 1996

[51] Int. Cl.$^6$ .................................................. F25B 49/00
[52] U.S. Cl. ................................................... 62/176.4
[58] Field of Search .......................... 62/330, 312, 176.4

[56] References Cited

U.S. PATENT DOCUMENTS

| | | | |
|---|---|---|---|
| 1,662,806 | 3/1928 | Hilger | 62/312 |
| 2,115,344 | 4/1938 | Stacey, Jr. | 52/312 |
| 2,158,684 | 5/1939 | Anderson | 62/176.4 |
| 2,160,984 | 6/1939 | Passur | 62/312 |
| 2,249,202 | 7/1941 | Glenn | 62/312 |
| 2,332,975 | 10/1943 | Palmer | 62/176.4 |
| 4,118,945 | 10/1978 | Boochever et al. | 62/176.4 |
| 4,249,388 | 2/1981 | Burns | 62/330 |

*Primary Examiner*—William E. Tapolcai
*Attorney, Agent, or Firm*—Veal & Associates

[57] ABSTRACT

A water cooling apparatus utilizes a conventional ice maker to produce ice which is deposited into a large insulated storage tank. The insulated storage tank includes a suspended grate to hold the deposited ice and spray nozzles positioned above the grate bathe the ice with water. Upon spraying, the ice suspended in the tank partially melts, combines with, and cools the sprayed water. A reservoir in the bottom of the tank collects the cooled water, and a sump pump in the bottom of the reservoir pumps water out of the storage tank to a distribution pump. The cooled water is further distributed under pressure to the fogging nozzles positioned in the enclosure's ventilation system. Sensors monitor the level of ice on the grate, the level of cooled water in the reservoir, and the temperature of the animal enclosure. Control circuitry supervises the amount of water sprayed over the ice, the production of ice into the storage tank, and the amount of water pumped out of the reservoir so that sufficient cooling of the enclosure is achieved. Regardless of the outside ambient temperature, the apparatus has the capacity to maintain the water temperature between 32° F. and 40° F. at the fogger nozzles in the enclosure's ventilation air stream. All of the components of the apparatus are powered by a traditional single phase electrical source.

6 Claims, 3 Drawing Sheets

COOLING APPARATUS FOR AN ANIMAL CONFINEMENT HOUSE

FIELD OF THE INVENTION

The present invention relates generally to animal husbandry and more specifically to environmental cooling systems for maintaining a selected temperature range in animal enclosures. In greater particularity the present invention relates to cooling apparatuses for cooling animal confinement houses or enclosures. In even greater particularity, the present invention relates to apparatuses for cooling water which is then delivered through a fogging system into a poultry house for cooling.

BACKGROUND OF THE INVENTION

The importance of temperature control and adequate ventilation has long been known in the field of livestock and poultry enclosures. An efficient conversion of feedstuff into marketable protein and fat products is of paramount importance to a poultry and livestock producer. Excessive or unreliable temperature control within the enclosure can result in animals with physiological stress from expending metabolic energy for controlling core body temperature. These animals tend to gain weight at a lower rate than animals raised in less stressful environments, and an animal's production of eggs and milk will also decrease in response to elevated stress. Slower rates of gain and lower production increase the costs to the producer thus lowering his profits.

To address this temperature stability concern, modern animal confinement enclosures include several apparatus which cooperate together within or near the structure itself for maintaining the internal ambient temperature within some preselected range. Typically, the apparatuses utilized for controlling the temperature within the animal enclosure include; fans, heaters, controllers, curtain operators, alarms, curtain drops, evaporative cooling systems, and control systems. Evaporative cooling systems are more economical than freon based systems and are used extensively in the poultry industry to cool confinement enclosures. In the evaporative type systems, water is transported into the animal enclosure where it is dispersed by fine misting nozzles or foggers into the ventilation system of the enclosure. Use of nozzles to create a fine mist in an enclosure for cooling purposes facilitates cooling and prevents water from reaching the floor of the enclosure which can have deleterious effects. In this type of system, also known as a fogging system, the air stream in the enclosure, created by a ventilation fan, absorbs the fine mist and gives up energy to the water molecules. This absorption process converts the water mist droplets into a vapor and reduces the temperature of the air in the air stream which reduces the air temperature in the enclosure. Fogging systems use water in a one-time, pass-through manner in which the water is dispersed into the enclosure.

A critical variable in achieving sufficient temperature reduction in the enclosure air stream is the water temperature at the fogging nozzle. On hot days, the temperature of the nozzle water must be below 40° F. to sufficiently lower the air stream temperature. Insufficient cooling of the air stream can cause excessive temperatures within the enclosure leading to reduced animal weight and possibly loss of animals. Evaporative systems using an average ground water temperature of 65° F. can only sustain an enclosure temperature of 89° F. In the past, glycol based cooling systems were needed to sufficiently lower the water temperature at the logger nozzle to below 40° F. during hot days. However, glycol systems require a package chiller and a heat exchanger, which increases the expense and complexity of the cooling system. Typically, a ten ton capacity chiller is the largest size that may be powered by a single phase electrical system, however due to the cooling requirement of the most animal enclosures, chillers larger than ten tons are usually needed, which must be powered with a three phase electrical voltage source. Three phase electrical supplies are not readily available in many rural farm areas making the installation of large package chillers impossible. Moreover, the daily cost of electricity for three phase based chillers over ten tons is prohibitive.

Therefore, rural animal farmers using fogging systems to cool their animal confinement enclosures have a need for an economical apparatus for reducing the temperature of water supplied to the fogging system. In addition, the cooling apparatus must be powered by electrical resources readily available in a rural setting.

SUMMARY OF THE INVENTION

It is the object of the present invention to provide cooled supply water to a fogging system in an animal enclosure for cooling purposes.

A further object of the invention is to cool water in a controlled manner using ice which can then be supplied to a fogging cooling system in an animal enclosure that meets the limited electrical resources of the rural farmer.

Another objective of the present invention is to introduce water over ice in an insulated tank in a controlled manner so that cooled water between 32° F. and 40° F. can be consistently and economically supplied to a fogging cooling system in an animal enclosure.

Briefly, the invention uses a conventional ice maker to produce ice which is deposited into a large insulated storage tank. The tank includes a suspended grate to hold the ice introduced into the tank and spray nozzles positioned above the grate bathe the ice with water. The ice suspended in the tank partially melts, combines with, and cools the water sprayed over the ice, and a reservoir in the bottom of the tank collects the cooled water. A submersible pump in the bottom of the reservoir pumps water out of the storage tank, and a distribution pump distributes the cooled water under pressure to the fogging nozzles positioned in the enclosure ventilation system. The submersible pump also pumps water out of the storage tank and back to the ice maker to increase ice making efficiency. Sensors monitor the level of ice on the grate, the level of cooled water in the reservoir, and the temperature of the animal enclosure. Control circuitry supervises the amount of water sprayed over the ice, the production of ice into the storage tank, and the amount of water pumped out of the reservoir so that sufficient cooling of the enclosure is maintained. The control circuitry also actuates a motorized valve in a water supply line to initiate the flow of water into the spray nozzles above the ice. Regardless of the outside ambient temperature, the apparatus has the capacity to maintain a water temperature of between 32° F. and 40° F. at the fogger nozzles in the enclosure air stream. All of the components of the apparatus are powered by traditional single phase electrical sources.

Other features and objects and advantages of the present invention will become apparent from a reading of the following description as well as a study of the appended drawings.

BRIEF DESCRIPTION OF THE DRAWINGS

A water cooling apparatus incorporating the features of the invention is depicted in the attached drawings which form a portion of the disclosure and wherein.

Figure I is a top transparent perspective view of the cooling apparatus showing the storage tank and the attached internal and external components.

DESCRIPTION OF THE PREFERRED EMBODIMENT

Figure 1:
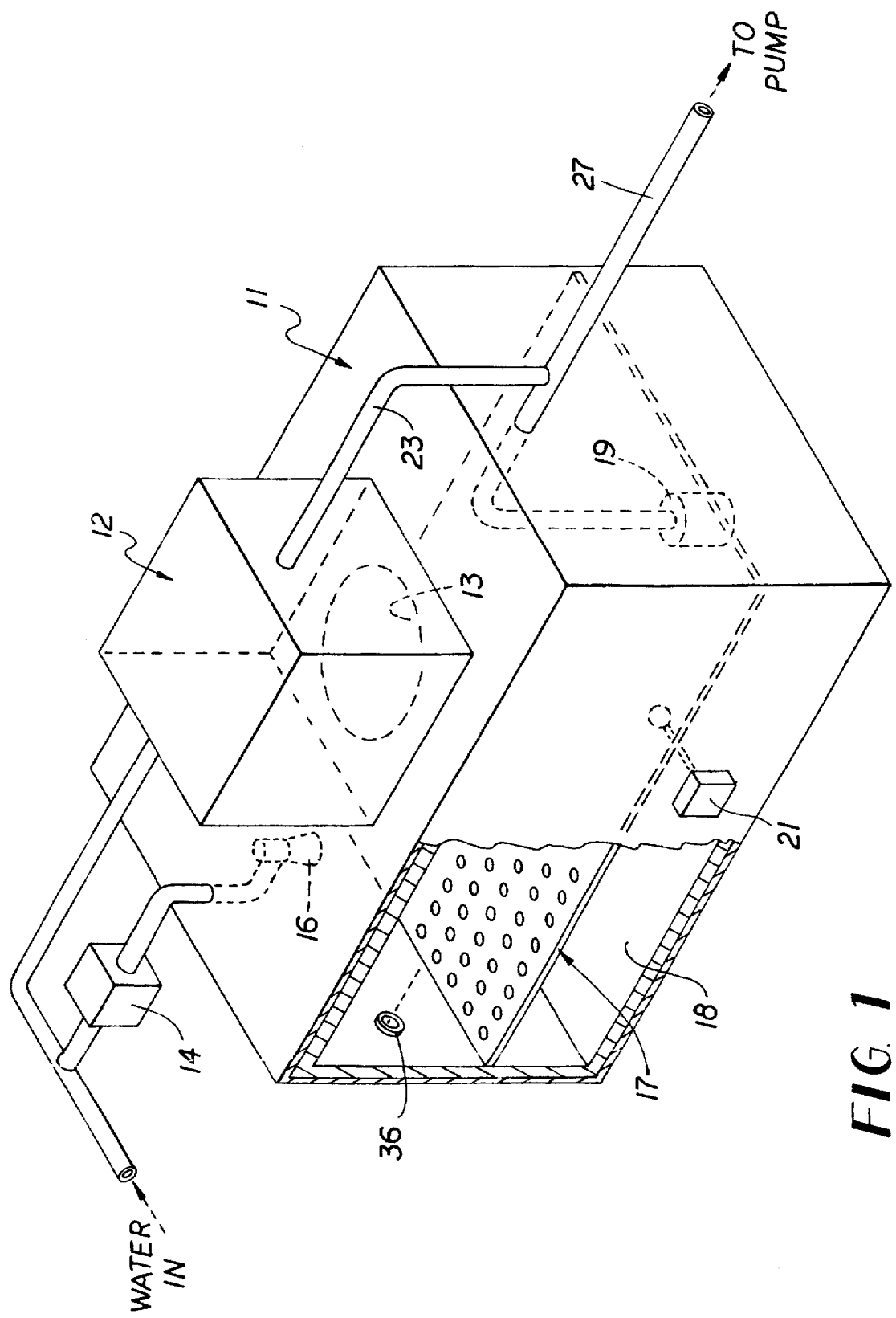

Referring to the drawings for a better understanding of the function and structure of the invention, it can be seen in FIG. 1 that the basic components of the cooling apparatus are an insulated storage tank 11, an ice machine 12, and an water inlet 26. Although the ice machine 12 is shown mounted on top of the storage tank 11, any positioning in which ice flow from the ice machine is facilitated is acceptable. The illustrated version discloses a simple opening 13 below the ice machine into which ice is deposited. Ice entering the tank through the opening 13 falls onto a grate 17 made up of 16-gauge galvanized sheet steel containing ¼" holes through-out. The grate is suspended by 1½"×1½"×⅛" angle iron to the walls of the tank, and the grate and storage tank have a capacity of 500 lbs. of ice. A water source is connected to motorized valve 14 which controls flow of water to a spray nozzle 16. Ordinary PVC (poly vinyl chloride) tubing can be used to connect all components, and insulating tape or insulating tubing must surround critical transfer areas to minimize heat introduction into the cooled water. In addition, storage tank 11 must be well insulated. A layer of conventional one-inch thick Styrofoam lining all areas of the storage tank will sufficiently insulate the tank to prevent heat introduction. The spray nozzle 16 provides a constant spray bath of supply water over the ice deposited onto the grate. Spray water melts, combines with, and is cooled by the ice on the grate. A reservoir 18 in the bottom of the tank below the grate holds the ice melt and cooled supply water and has a capacity of 150 gallons. A float switch 21 located in the reservoir controls the motorized valve 14. As the float drops below a preselected level, an electrical signal from the float switch opens the valve 14 to supply more water to nozzle 16 which increases the level of cooled water in the reservoir. In addition to the float switch sensor switch 21, an infrared sensor switch 36 is mounted on the wall of the tank mid-way between the grate and the top of the storage tank. The infrared sensor 36 is a conventional parabolic diffusion variety, however, any sensor such as an optical or ultrasonic variety would be suitable. The sensor 36 monitors the level of ice present on the grate and sends a signal to the ice maker to produce more ice when the level of ice on the grate falls below a preselected level. The reservoir in the bottom of the tank includes a ½ hp submersible pump 19 for pumping the cooled water out of the tank and to a distribution pump for pumping to the animal enclosure foggers. In addition to pumping cooled water to the fogger distribution pump, the pump 19 also pumps some cooled water back to ice maker 12 via pipe 23 to increase ice making efficiency.

Figure 2:
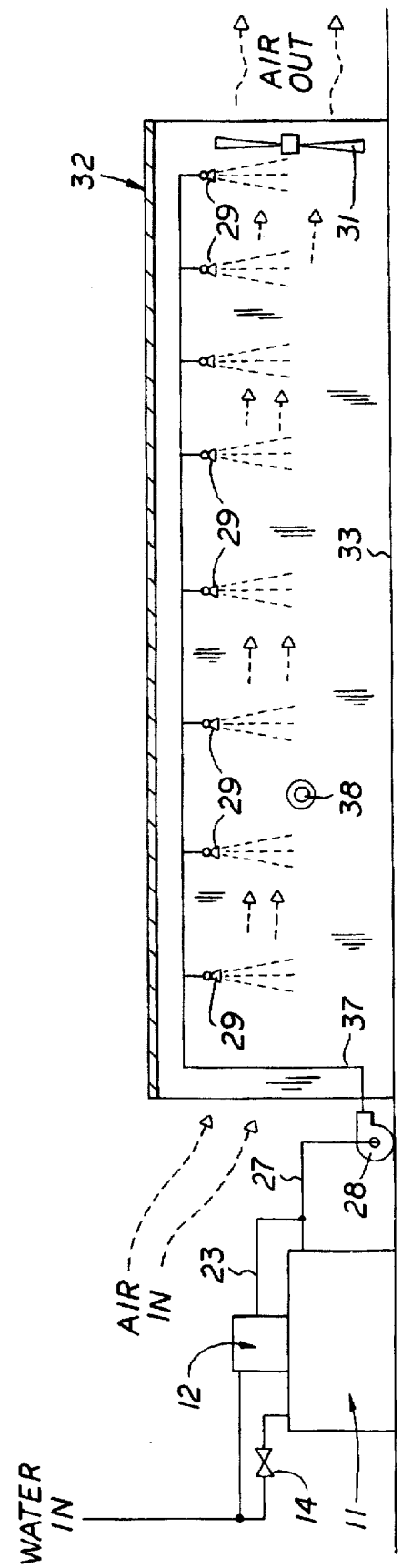
FIG. 2 is a diagrammatic view of the cooling apparatus connected to the fogging system of the animal enclosure; and, FIG. 3 is a diagram showing the sensor and control connections.

As shown in FIG. 2, cooled water is pumped by the submersible pump 19 outside of the storage tank via an insulated PVC line to a distribution pump 28. Distribution pump 28 then pumps the cooled water under pressure to the logger nozzles 29 positioned within the enclosure 32. Ventilation fan 31 moves the cooled air through the enclosure 32 thereby reducing the enclosure temperature. With proper insulation of the transfer lines 27 and 37, no more than 2°–3° F. increase in water temperature will be observed during the transfer of the cooled reservoir water to the logger nozzles 29. The fogger nozzles 29 are designed such that a fine high pressured mist will be emitted into the air stream thereby cooling the air temperature. Due to evaporation of the fine water particles, no water will reach the floor 33 of the enclosure 32. A temperature sensor and thermostat 38 is electrically connected to submersible pump 19 so that cold water from the reservoir will be pumped to the distribution pump 28 and on to the fogger nozzles 29 on demand to maintain a preselected temperature range within the enclosure 32. Assuming a 35° F. Fogger nozzle water temperature, a temperature of 77° F. will be sustained in the enclosure when the ambient outside temperature is 98° F. A 77°/98° F. temperature ratio is a significant improvement over existing systems that depend on ground water temperatures.

Figure 3:
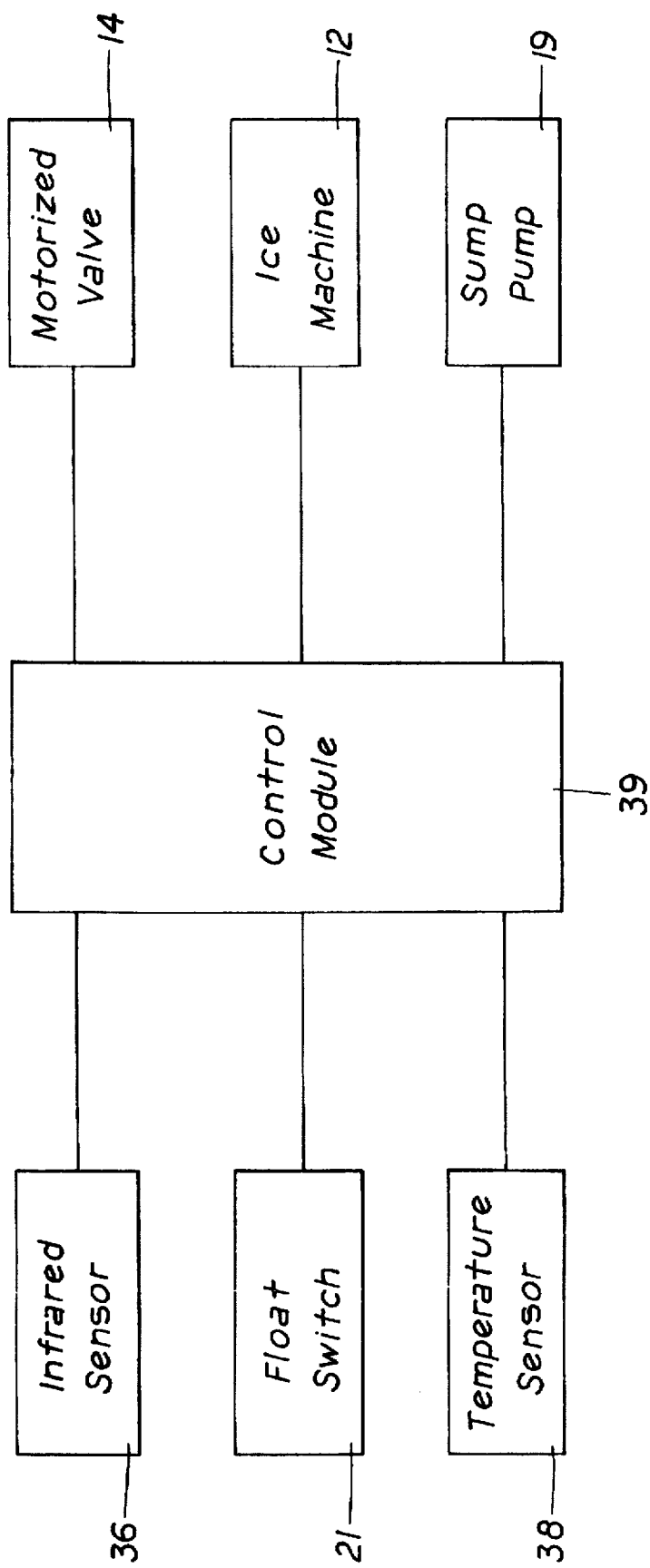

Although the invention is shown with isolated electrical connections from a single sensor to control a single specific component, it should be clear that electrical signals from each of the sensors 21, 36, and 37 could be alternatively routed to a self-contained control module or a control module integrated with a control system such as disclosed by Crider in U.S. Pat. No. 5,336,131, herein incorporated by reference. A self-contained control module 39 (see FIG. 3) or a system similar to Crider's will actuate water supply valve 14, ice machine 12, and submersible pump 19 in a cooperative fashion to increase the efficiency of the invention. Moreover, integration of the cooling apparatus into a software directed environmental control system of an animal enclosure will cause even more efficiency of the enclosure cooling system.

While I have shown my invention in one form, it will be obvious to those skilled in the art that it is not so limited but is susceptible of various changes and modifications without departing from the spirit thereof.

Having set forth the nature of the present invention, what is claimed is:

1. In combination with a fogging cooling system for cooling the environment of an enclosure for animals, a water cooling and storage apparatus, comprising:

a) ice producing means for producing ice;

b) storage means for receiving and holding ice from said ice producing means;

c) spraying means for spraying water over said ice in said storage means so that said ice partially melts, combines with, and cools said water;

d) pumping means for pumping said cooled water out of said storage means and to said fogging system for cooling said enclosure; and, e) control means for controlling said ice producing means, said spraying means, and said pumping means for regulating said apparatus wherein said control means comprises first sensing means in said storage means for monitoring how much chilled water is present in said storage means, second sensing means for monitoring how much ice is present in said storage means, third sensing means for monitoring temperature inside said animal enclosure, and circuitry means for regulating said spraying means, said pumping means, and said ice producing means in response to said first, second, and third sensing means so that said temperature in said animal enclosure is maintained within a selected temperature range.

2. An apparatus as recited in claim 1, wherein said storage means includes an opening for receiving said ice there through, a reservoir for collecting and holding said cooled water, insulating means for insulating said storage means so that heat transfer into said tank is minimized, and grate means for suspending said ice above said cooled water in said reservoir to avoid submerging said ice in said cooled water.

3. An apparatus as recited in claim 2, wherein said pumping means comprises a sump pump for pumping said cooled water from said storage means to said fogging means and to said ice producing means.

4. An apparatus for cooling the environment in an enclosure for animals, comprising:
   a) ice producing means for producing ice;
   b) a storage tank for receiving and holding ice from said ice maker means;
   c) means for introducing water over said ice in said tank so that said ice partially melts, combines with, and cools said water to a temperature between 32° F. and 40° F.;
   d) pumping means for pumping said cooled water out of said tank;
   e) fogging means connected to said pumping means for supplying a high pressure water mist into a ventilation air stream of said enclosure so that said enclosure is cooled; and,
   f) control means for controlling said ice maker means, said inlet water spray nozzle, and said distribution pump means for regulating said apparatus, wherein said control means comprises first sensing means in said storage tank for monitoring how much chilled water is present in said tank, second sensing means for monitoring how much ice is present in said tank, third sensing means for monitoring temperature inside said animal enclosure, and circuitry means for regulating said spraying means, said pumping means, and said ice producing means in response to said first, second, and third sensing means so that said temperature in said animal enclosure is maintained within a selected temperature range.

5. An apparatus as recited in claim 4, wherein means for introducing water over said ice comprises a least one spray nozzle for spraying said water over said ice and valve means for initiating flow of said water to said spray nozzle.

6. An apparatus as recited in claim 5, wherein said storage tank includes an opening for receiving said ice there through, a reservoir for collecting and holding said cooled water, insulating means for insulating said tank so that heat transfer into said tank is minimized, and grate means for suspending said ice above said cooled water in said reservoir to avoid submerging said ice in said cooled water.

* * * * *